US012761801B2

(12) United States Patent
Teng et al.

(10) Patent No.: US 12,761,801 B2
(45) Date of Patent: Oct. 13, 2026

(54) FLASH MEMORY CONTROLLER AND FLASH MEMORY ACCESS METHOD

(71) Applicant: Silicon Motion Inc., Jhubei City (TW)

(72) Inventors: Duen Yih Teng, Jhubei City (TW); Mao Ruei Li, Jhubei City (TW)

(73) Assignee: Silicon Motion Inc., Jhubei City (TW)

( * ) Notice: Subject to any disclaimer, the term of this patent is extended or adjusted under 35 U.S.C. 154(b) by 47 days.

(21) Appl. No.: 18/901,733

(22) Filed: Sep. 30, 2024

(65) Prior Publication Data

US 2025/0328250 A1 Oct. 23, 2025

(30) Foreign Application Priority Data

Apr. 19, 2024 (TW) ................................ 113114698

(51) Int. Cl.
*H03M 13/00* (2006.01)
*G06F 3/06* (2006.01)

(52) U.S. Cl.
CPC .......... *G06F 3/0613* (2013.01); *G06F 3/0659* (2013.01); *G06F 3/0679* (2013.01)

(58) Field of Classification Search
CPC ..... G06F 3/0613; G06F 3/0659; G06F 3/0679
See application file for complete search history.

(56) References Cited

U.S. PATENT DOCUMENTS

| | | | | |
|---|---|---|---|---|
| 9,548,759 | B1 * | 1/2017 | Rad | H03M 13/6516 |
| 10,565,040 | B2 * | 2/2020 | Ryabinin | G06F 1/32 |
| 11,206,043 | B2 * | 12/2021 | Asadi | H03M 13/1108 |
| 11,316,532 | B1 * | 4/2022 | Hsu | H03M 13/1145 |
| 11,770,133 | B1 * | 9/2023 | Asadi | H03M 13/1108 714/704 |
| 11,929,762 | B2 | 3/2024 | Lee et al. | |
| 2010/0185913 | A1 | 7/2010 | Liao et al. | |
| 2013/0332797 | A1 | 12/2013 | Chung | |

FOREIGN PATENT DOCUMENTS

TW 202322576 A 6/2023

* cited by examiner

*Primary Examiner* — Esaw T Abraham
(74) *Attorney, Agent, or Firm* — The Roy Gross Law Firm, LLC; Roy D. Gross

(57) ABSTRACT

A flash memory controller and a flash memory access method are provided. The flash memory controller comprises a decoder, performing a decoding operation based on a base matrix of a quasi-cyclic low-density parity-check code and the channel values read from a flash memory. The decoder comprises a variable node block, a V2C shift block, a check node block, which are serially coupled. The decoder further comprises a status data shift block, which is parallelly coupled with the check node block, circularly shifts the status data of the check node block and feeds back to the check node block. Due to the number of serially coupled blocks is only three, the convergence speed of the iterative decoding process is improved, thereby the flash memory access performance is enhanced.

13 Claims, 6 Drawing Sheets

$$
\mathbf{H} = \begin{array}{c} \\ \end{array}
\begin{array}{c}
\begin{array}{cccccccccccccccccccc} v_0 & v_1 & v_2 & v_3 & v_4 & v_5 & v_6 & v_7 & v_8 & v_9 & v_{10} & v_{11} & v_{12} & v_{13} & v_{14} & v_{15} & v_{16} & v_{17} & v_{18} & v_{19} \end{array} \\
\left[\begin{array}{ccccc:ccccc:ccccc:ccccc}
0&0&1&0&0&0&0&0&1&0&1&0&0&0&0&0&1&0&0&0\\
0&0&0&1&0&0&0&0&0&1&0&1&0&0&0&0&0&1&0&0\\
0&0&0&0&1&1&0&0&0&0&0&0&1&0&0&0&0&0&1&0\\
1&0&0&0&0&0&1&0&0&0&0&0&0&1&0&0&0&0&0&1\\
0&1&0&0&0&0&0&1&0&0&0&0&0&0&1&1&0&0&0&0\\
\hdashline
0&0&0&1&0&0&0&0&0&1&0&1&0&0&0&0&1&0&0&0\\
0&0&0&0&1&1&0&0&0&0&0&0&1&0&0&0&0&1&0&0\\
1&0&0&0&0&0&1&0&0&0&0&0&0&1&0&0&0&0&1&0\\
0&1&0&0&0&0&0&1&0&0&0&0&0&0&1&0&0&0&0&1\\
0&0&1&0&0&0&0&0&1&0&1&0&0&0&0&1&0&0&0&0
\end{array}\right]_{10\times 20}
\end{array}
\begin{array}{c} c_0\\ c_1\\ c_2\\ c_3\\ c_4\\ c_5\\ c_6\\ c_7\\ c_8\\ c_9 \end{array}
$$

FIG. 1A

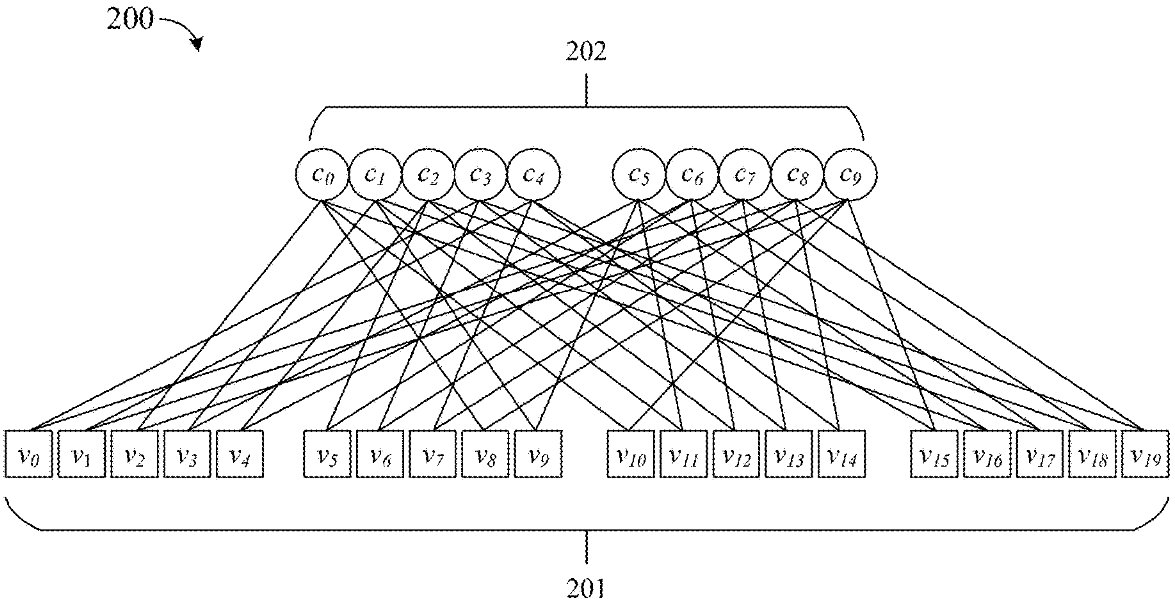

FIG. 1B

FLASH MEMORY CONTROLLER AND FLASH MEMORY ACCESS METHOD

CROSS REFERENCE TO RELATED APPLICATIONS

This application claims priority to Taiwan Patent Application Serial No. 113114698, filed Apr. 19, 2024, the entire contents of which are incorporated herein by reference.

FIELD OF DISCLOSURE

The present invention relates to a storage device, particularly involving a flash memory controller and flash memory access method utilizing quasi-cyclic low-density parity-check code.

BACKGROUND

Low-density parity check (LDPC) code is a type of the forward error correction (FEC) code and features that its theoretical coding gain can approach the Shannon limit. The parity check matrix of a general LDPC code lacks regular numerical properties, which complicates the hardware implementation of a large parity check matrix. Quasi-cyclic low-density parity-check (QC-LDPC) code constitutes a significant structured branch within LDPC codes, characterized by a specific structure in its parity check matrix H. The parity check matrix of size M×N can be subdivided into a plurality of equally sized sub-square matrices of size K×K, each of these sub-square matrices is either a circularly shifted unit matrix or a zero matrix. FIG. 1A illustrates an example of the parity check matrix H with M=10, N=20, K=5. The structural regularity reduces the complexity of an LDPC encoder/decoder, rendering it widely applicable in flash memory systems and numerous digital communication systems.

In a QC-LDPC parity check matrix, each sub-square matrix is either a circularly shifted K×K unit matrix or a zero matrix. The parity check matrix H can be equivalently represented by a X×Y base matrix W where X=M/K and Y=N/K. In this representation, each element of the base matrix W responds to the cyclic shift amount of the corresponding sub-square matrix in the parity check matrix H. The symbol "Z" represents that the sub-square matrix is a zero matrix. In the example of FIG. 1A with M=10, N=20, K=5, X=2, Y=4, the corresponding base matrix W is as follows:

$$W = \begin{bmatrix} 2 & 3 & 0 & 1 \\ 3 & 4 & 1 & 1 \end{bmatrix} \tag{1}$$

The parity check matrix HI can be graphically represented by a Tanner graph. FIG. 1B illustrates the Tanner graph of a QC-LDPC code corresponding to FIG. 1A. The variable nodes 201, $v_0$~$v_{19}$, correspond to the columns of the parity check matrix H, and the check nodes 202, $c_0$~$c_9$, correspond to the rows of the parity check matrix H. In the parity check matrix H, each "1" represents a connection between one of the variable nodes 201 and one of the check nodes 202, whereas "0" indicates no connection. The message passing algorithm serves as the core of the LDPC decoding, with messages iteratively exchanged between the variable nodes and the check nodes. By computing the probabilities of each variable node being 0 or 1, an estimate of a codeword is derived. The decoding outcome is determined when the product of the estimated codeword and the parity check matrix equals zero.

However, as the number of the variable nodes 201 increases, it poses a challenge for hardware area and decoding convergence speed. Therefore, many QC-LDPC decoders employ a layered schedule architecture, wherein the variable nodes are partitioned into groups and processed sequentially, one group at a time. By grouping every K variable nodes together, all variable nodes are partitioned into Y groups. Under the layered schedule architecture, for an $i^{th}$ iteration, the process of the message passing algorithm for a $g^{th}$ group, $g\in\{0, \ldots, Y-1\}$, corresponding to the variable nodes $v_n$ with $n=gK, \ldots, (g+1)K-1$, can be outlined as follows.

Based on the R messages from the previous iteration, the $(i-1)^{th}$ iteration, the Q message, denoted as $$Q_{mn}^{(i)},$$

that the variable node $v_n$ should send to the check node $c_m$ in the $i^{th}$ iteration is generated using Equation (2), $$Q_{mn}^{(i)} = P_n + \sum_{m' \in M(n), m' \neq m} R_{m'n}^{(i-1)},\ n \in \{gK, \ldots, (g+1)K-1\},\ m \in M(n) \tag{2}$$

$$Q_{mn}^{(i)} = Q_{mn}^{(i-1)},\ n \notin \{gK, \ldots, (g+1)K-1\},\ m \in M(n) \tag{3}$$

wherein $P_n$ represents the log-likelihood ratio, LLR, of the $n^{th}$ channel value read from the flash memory, M(n) is all check nodes connected to the variable node $v_n$. The values of the Q messages associated with variable nodes not belonging to the $g^{th}$ group remain unchanged. The output of the decoding outcome (not shown in FIG. 2) is generated according to Equation (4).

$$Q_n^{(i)} = P_n + \sum_{m' \in M(n)} R_{m'n}^{(i-1)} \tag{4}$$

The estimated codeword can be derived by examining the sign of $P_n$. The estimated codeword is determined as the decoding outcome when the product of the estimated codeword and the parity check matrix equals zero.

Based on the Q messages, each check node $c_m$ generates the R message, denoted as $$R_{mn}^{(i)},$$

to be sent to the variable nodes $v_n$ of the $g^{th}$ group in the $i^{th}$ iteration according to Equations (6) and (7).

$$R_{mn}^{(i)} = \prod_{n' \in N(m), n' \neq n} \operatorname{sign}\left(Q_{mn'}^{(i)}\right) \times \min_{n' \in N(m), n' \neq n} \left(\left|Q_{mn'}^{(i)}\right|\right),\quad n \in \{gK, \ldots, (g+1)K-1\},\ m \in M(n) \tag{6}$$

$$R_{mn}^{(i)} = R_{mn}^{(i-1)},\ n \notin \{gK, \ldots, (g+1)K-1\},\ m \in M(n) \tag{7}$$

wherein N(m) represents all variable nodes connected to the check node $c_m$. The values of the R messages related to variable nodes not belonging to the $g^{th}$ group remain unchanged.

FIG. 2 illustrates a block diagram of a conventional QC-LDPC decoder 300 that employs a layered schedule by grouping every K variable nodes together. The decoder comprises a variable node block 301, a Q memory 302, a V2C shift block 303 (V2C refers to variable node to check node), a check node block 304, a C2V shift block 305 (C2V refers to check node to variable node), an R memory 306, a channel memory 307, and a shift parameter unit 309. The variable node block 301 updates the Q messages based on the R messages stored in the R memory 306 using Equation (2). All Q messages are stored in the Q memory 302. In the layered architecture of the QC-LDPC decoder 300, the Q messages output by the variable node block 301 are circularly shifted to align with the order of the check nodes through the V2C shift block 303 according to the shift parameter 309*a* of the shift parameter unit 309. The check node block 304 receives the output of the V2C shift block 303 and updates the R messages using Equation (6). The R messages output by the check node block 304 are circularly shifted back to align with the order of the variable nodes through the C2V shift block 305 according to the shift parameter 309*b* of the shift parameter unit 309. All R messages are stored in the R memory 306.

FIG. 3 illustrates a block diagram of the shift parameter unit 309, which comprises a read-only memory 320 and a pipeline register 321 with registers $d_1$~$d_Y$, each of which can store X values. The read-only memory stores the XX Y base matrix, and each column of the base matrix is output sequentially to the pipeline register 321 every clock cycle. Based on the characteristics of QC-LDPC code, the values in the base matrix present the shift parameters needed for V2C shift block 303 and the C2V shift block 305, and the circular shift direction for the C2V shift block 305 is opposite to the V2C shift block 303. Since each functional block of the QC-LDPC decoder 300 requires one or more clock cycles for operation, the base matrix values need to be delayed by a specific number of clock cycles to match the operation timings of the V2C shift block 303 and the C2V shift block 305. The shift parameters 309*a* and 309*b* produced by the shift parameter unit 309 are derived from the values stored in certain registers of the pipeline register 321, as an example shown in FIG. 3.

From FIG. 2, it is evident that the variable node block 301, the V2C shift block 303, the check node block 304, and the C2V shift block 305 are serially coupled. For one decoding cycle, the process should go through the variable node block 301, the V2C shift block 303, the check node block 304, the C2V shift block 305, and then return to the variable node block 301, totaling four blocks. Each block operation requires one or more clock cycles. The more clock cycles accumulated in a single decoding cycle, the slower the decoder's convergence speed. Hence, reducing the total clock cycles in one decoding cycle is crucial for improving the throughput of QC-LDPC decoder and the flash memory access efficiency.

SUMMARY OF DISCLOSURE

In order to improve the flash memory access efficiency, the present invention provides a flash memory controller and an access method for flash memory by adjusting the decoder structure and improving the convergence speed of iteration calculations, thereby increasing the throughput of the decoder.

Accordingly, the present invention provides a flash memory controller for accessing a flash memory, the flash memory controller comprises: a read-only memory, a microprocessor, and a decoder. The read-only memory stores a program code. The microprocessor is used to execute the program code to control access to the flash memory. The decoder performs decoding process of a quasi-cyclic low-density parity-check (QC-LDPC) code, wherein the decoding process involves a plurality of Q messages and a plurality of R messages. The decoder comprises: a shift parameter unit, which outputs a first shift parameter and a second shift parameter based on a X×Y base matrix of the QC-LDPC code; a Q memory for storing the plurality of Q messages; an R memory for storing the plurality of R messages; a variable node block for updating the plurality of Q messages based on channel values read from the flash memory and the plurality of R messages; a V2C shift block for circularly shifting the plurality of Q messages based on the first shift parameter and outputting a plurality of Q' messages; a check node block for updating the plurality of R messages and outputting a plurality of status data S based on the plurality of Q' messages and the plurality of status data S', wherein each status data S comprises a minimum value, a second minimum value, an index of the minimum value, and the global sign value; a second shift block for circularly shifting the plurality of status data S based on the second shift parameter and feeding back the plurality of status data S' to the check node block.

In some embodiments, the check node block comprises a sub-block, the second shift block comprises a shift unit, and the second shift parameter comprises a sub-parameter. The plurality of status data S comprises a first status data S through a $K^{th}$ status data with K being an integer. The plurality of status data S' comprises a first status data S' through a $K^{th}$ status data status data S'. The plurality of Q' messages comprise a first Q' message through a $K^{th}$ Q' message. The plurality of R messages comprise a first R through a $K^{th}$ R message. The shift unit of the second shift block receives the first status data S through the $K^{th}$ status data S, and perform circular shift according to the sub-parameter of the second shift parameter, and generates the first status data S' through the $K^{th}$ status data S'. The sub-block of the check node block comprises a first check node unit through a $K^{th}$ check node unit, wherein the $k^{th}$ check node unit receives the $k^{th}$ Q' message and the $k^{th}$ status data S', updates the $k^{th}$ R message, and outputs the $k^{th}$ status data S with k being an integer from 1 to K.

In some embodiments, the check node block comprises X sub-blocks, each sub-block of the check node block comprises K check node units. The second shift block comprises X shift units, and the second shift parameter comprises X sub-parameters. The plurality of status data S comprises X·K status data S, and the plurality of status data S' comprises X·K status data S'. The plurality of Q' message comprises (X·K) Q' messages, and the plurality of R message comprises (X·K) R messages.

In some embodiments, the shift parameter unit comprises: a read-only memory for storing the X×Y base matrix; and a pipeline register comprising a plurality of registers with each register being capable of storing X values; wherein the number of registers in the pipeline register is less than or equal to Y, each column of the base matrix is output sequentially to the pipeline register for each clock cycle; the first shift parameter output by the shift parameter unit is a difference between a first register and a second register in the pipeline register, and the second shift parameter output by the shift parameter unit is a difference between a third register and a fourth register in the pipeline register wherein the first register is adjacent to the second register and the third register is adjacent to the fourth register.

The present invention also provides a method for accessing a flash memory, for use in a memory controller. The method comprises: receiving channel values read from the flash memory and performing a decoding process on the channel values in an iterative manner according to a parity check matrix of a quasi-cyclic low-density parity-check (QC-LDPC) code, wherein the decoding process involves a plurality of Q messages and a plurality of R messages.

In some embodiments, the decoding process comprises: calculating a first shift parameter and a second shift parameter based on a shift parameter matrix; updating the plurality of Q messages based on the channel values and the plurality of R messages; performing circular shift on the plurality of Q messages to generate a plurality of Q' messages according to the first shift parameter; updating the plurality of R messages based on the plurality of Q' messages and the plurality of status data S' and outputting the plurality of status data S.

In some embodiments, the shift parameter matrix is initialized with a base matrix corresponding to the parity check matrix. For each clock cycle, a circular shift of one column is applied to the shift parameter matrix. The first shift parameter is a difference between a specific first column and a specific second column of the shift parameter matrix, while the second shift parameter is a difference between a specific third column and a specific fourth column of the shift parameter matrix.

Compared to conventional design, the present invention provides a flash memory controller and access method for flash memory. By adjusting the QC-LDPC decoder architecture, the number of serially coupled blocks in the decoding loop is reduced to only three: the variable node block, the V2C shift block, and the check node block. This reduction in the number of blocks helps to improve the convergence speed of the decoding iteration, thereby enhancing flash memory access efficiency.

BRIEF DESCRIPTION OF DRAWINGS

FIG. 1A illustrates an example of a parity check matrix of a QC-LDPC code.

FIG. 1B illustrates a Tanner graph corresponding to FIG. 1A.

DETAILED DESCRIPTION

Figure 2:
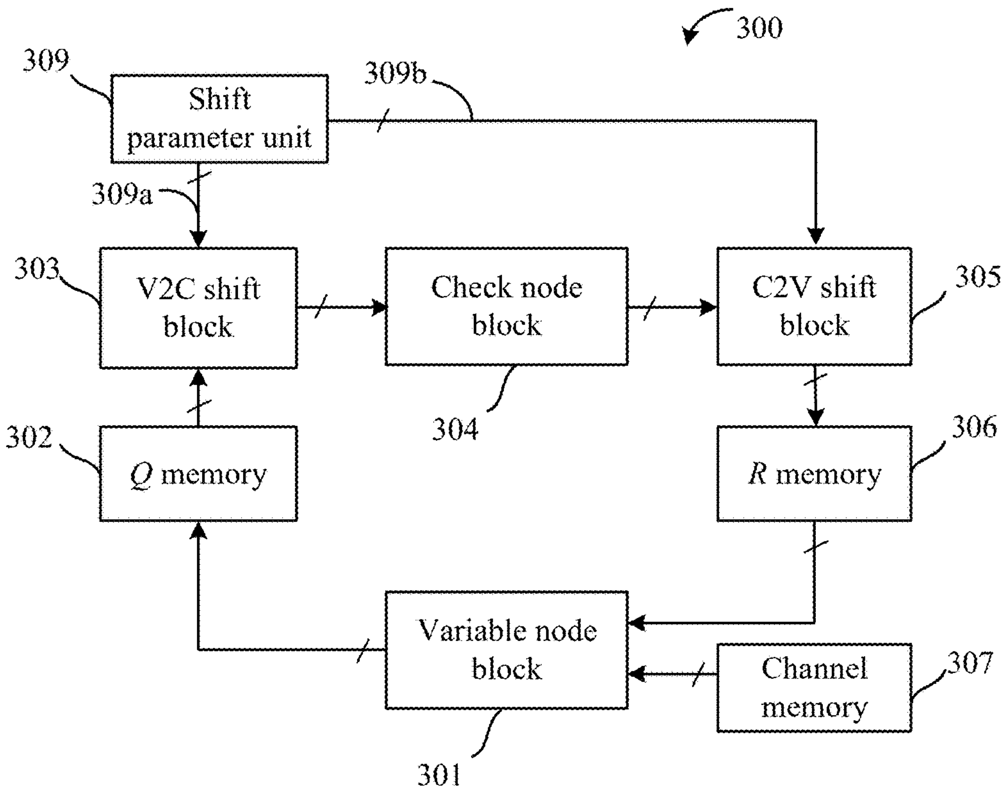
FIG. 2 (Prior Art)
FIG. 2 illustrates a block diagram of a conventional QC-LDPC decoder.
Figure 3:
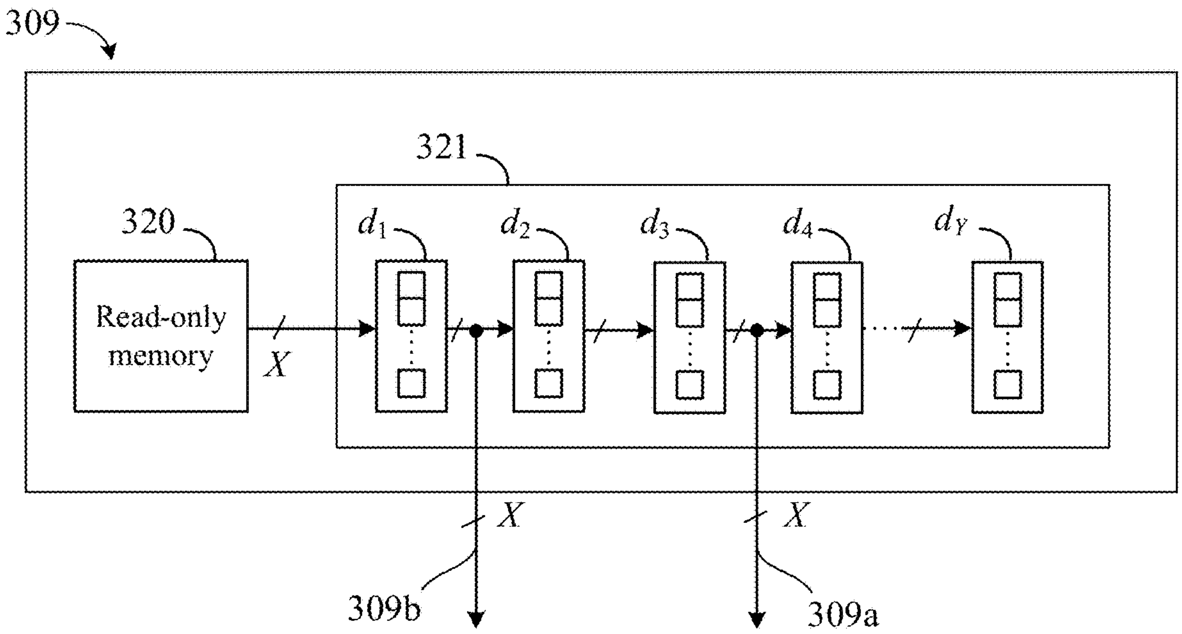
FIG. 3 (Prior Art)
FIG. 3 illustrates a block diagram of a conventional shift parameter unit.

The exemplary embodiments of the present disclosure will now be elaborated upon with reference to the accompanying drawings. However, it should be noted that these exemplary embodiments can take many forms and should not be interpreted as being confined to the embodiments set forth herein. Instead, these embodiments are provided to ensure that this disclosure is comprehensive and thorough, and effectively communicates the full scope of the disclosure to those skilled in the art. The drawings are merely schematic illustrations of the disclosure, and the components depicted in the drawings are not necessarily drawn to scale. Identical reference numerals in the drawings denote identical or similar parts, hence, repeated descriptions thereof will be omitted for brevity.

Figure 4:
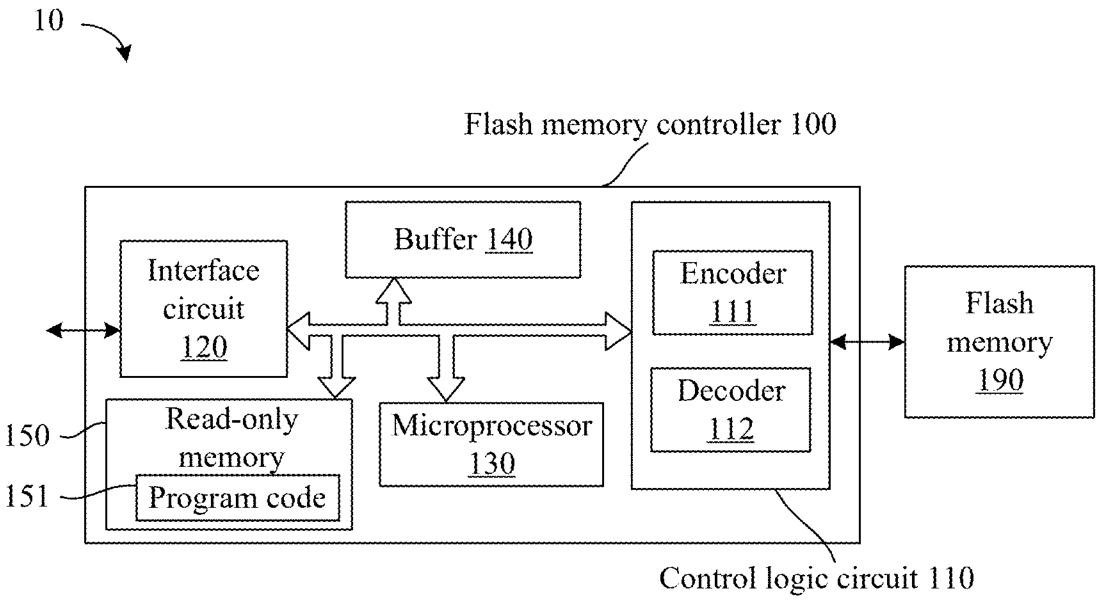
FIG. 4 illustrates a block diagram of a memory device according to an embodiment of the present invention.

Please refer to FIG. 4, which illustrates a block diagram of a memory device 10 according to an embodiment of the present invention. The memory device 10 comprises a flash memory controller 100 and a flash memory 190. The flash memory controller 100 is used to control the operation of the memory device 10 and the flash memory 190. The memory device 10 may include, but is not limited to, a solid-state drive or various type of embedded memory device, such as embedded memory device that complies with the Peripheral Component Interconnect Express (PCIe) standard.

As shown in FIG. 4, the flash memory controller 100 comprises a control logic circuit 110, an interface circuit 120, a microprocessor 130, a buffer 140, and a read-only memory 150. The flash memory controller 100 is coupled to a flash memory 190 through the control logic circuit 110 to transfer commands and access data. The flash memory controller 100 is coupled to a host device (not shown in the FIG. 4) through the interface circuit 120. The microprocessor 130 is coupled to the control logic circuit 110, the interface circuit 120, the buffer 140, and the read-only memory 150. The buffer 140 could be a dynamic random-access memory (DRAM), a static random-access memory (SRAM), or other types of volatile memory, but not limited to these. The read-only memory 150 is utilized to store a program code 151.

Optionally, the host device may comprise a processor and power supply circuit. The processor controls the operation of the host device, while the power supply circuit provides power to the processor and the memory device 10, and outputs one or more drive voltages to the memory device 10. The memory device 10 stores data for the host device and receives drive voltages from the host device as its power source. The host device may be, but not limited to, a mobile device, a wearable device, a tablet, or a personal computer such as desktop and laptop.

Optionally, the interface circuit 120 of the flash memory controller 100 complies with a specific communication standard, such as, but not limited to, Serial Advanced Technology Attachment (SATA) standard, Peripheral Component Interconnect (PCI) standard, PCIe standard, Universal Flash Storage (UFS) standard, and is capable of communicating in accordance with the chosen standard.

The flash memory controller 100 is capable of performing a variety of control operations by utilizing the microprocessor 130 to execute the code 151. For example, the controller logic circuit 110 controls access to the flash memory 190, the interface circuit 120 communicates with the host device, and the buffer 140 carries out necessary buffering tasks. Specifically, the host device sends host commands and logical addresses to the flash memory controller 100. The microprocessor 130 receives and processes these host commands and the logical addresses through the interface circuit 120 and converts the host commands into memory operation commands. It then operates on the memory unit within the flash memory 190 at the corresponding physical address, which may involve reading and/or writing data pages. This physical address correlates to the logical address provided by the host device.

As shown in FIG. 4, the control logic circuit 110 comprises an encoder 111 and a decoder 112. The encoder 111 encodes the data intended for writing to the flash memory 190, while the decoder 112 decodes the channel values read from the flash memory 190. When a read command is issued by the host device, the microprocessor 130 can convert/decode the read command from the host device (comprising logic address) into corresponding internal control signals (comprising the physical address of the flash memory 190). Based on the internal control signals, the control logic circuit 110 can access/control the flash memory 190 to read the original codeword within it. The decoder 112 within the control logic circuit 110 conducts a LDPC decoding on channel values read from the flash memory, decodes the channel values into decoded data, and temporarily store the decoded data in the buffer 140. Subsequently, the microprocessor 130 can return the decoded data stored in the buffer 140 to the host device.

Figure 5:
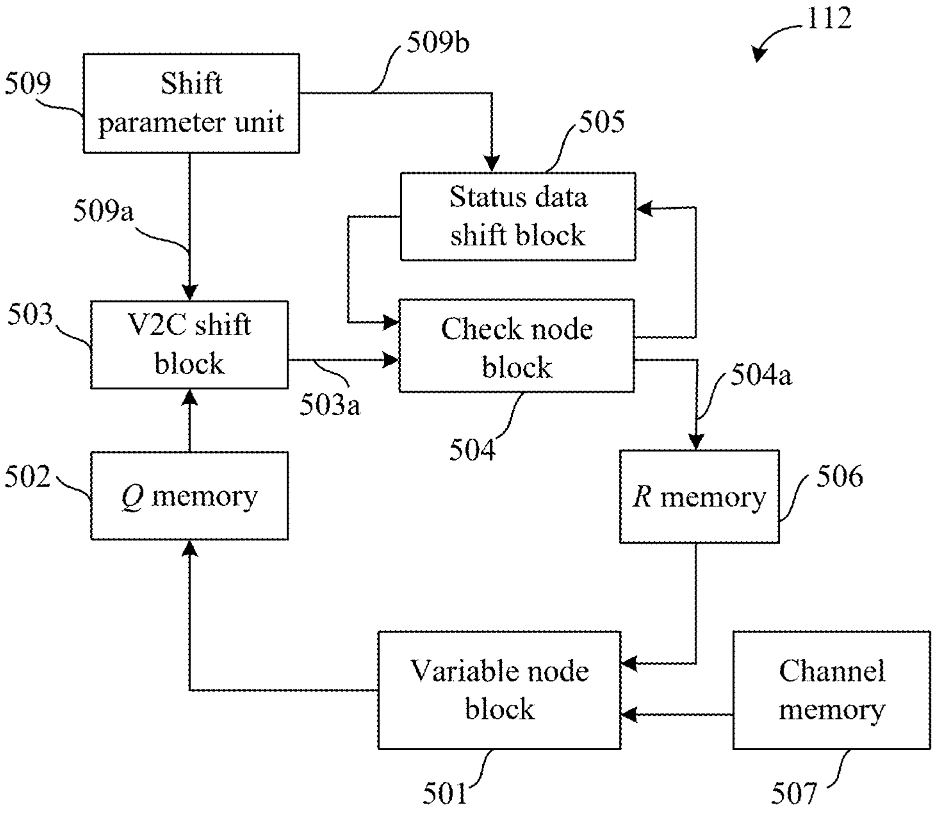
FIG. 5 illustrates a block diagram of a QC-LDPC decoder according to an embodiment of the present invention.

Please refer to FIG. 5, which illustrates a block diagram of the decoder 112 according to an embodiment of the present invention. The decoder 112 comprises a variable node block 501, a Q memory 502, a V2C shift block 503, a check node block 504, a status data shift block 505, an R memory 506, a channel memory 507, and a shift parameter unit 509. The decoder 112 is structured with a layered schedule architecture, which processes iterations in layers by grouping every K variable nodes into a group. The data read from the flash memory 190, referred to as channel values for the decoder, is stored in the channel memory 507. A brief description of the decoding operation for one decoding loop is as follows. The variable node block 501 updates the Q messages based on the R messages stored in the R memory 506 and the channel values stored in the channel memory 507. All Q messages are stored in the Q memory 502. The Q messages output by the variable node block 501 are circularly shifted by the V2C shift block 503 according to the shift parameter 509*a* output by the shift parameter unit 309 to generate Q' messages 503*a*. The status data in the process of the check node block 504 operation is circularly shifted by the status data shift block 505 according to the shift parameter 509*b* output by the shift parameter unit 309 and fed back to the check node block 504. Based on the output of the status data shift block 505 and the Q' message 503*a* from the V2C shift block 503, the check node block 504 generates the R messages 504*a*. All R messages are stored in the R memory 306. This process forms one decoding loop of the decoding operation.

Figure 6:
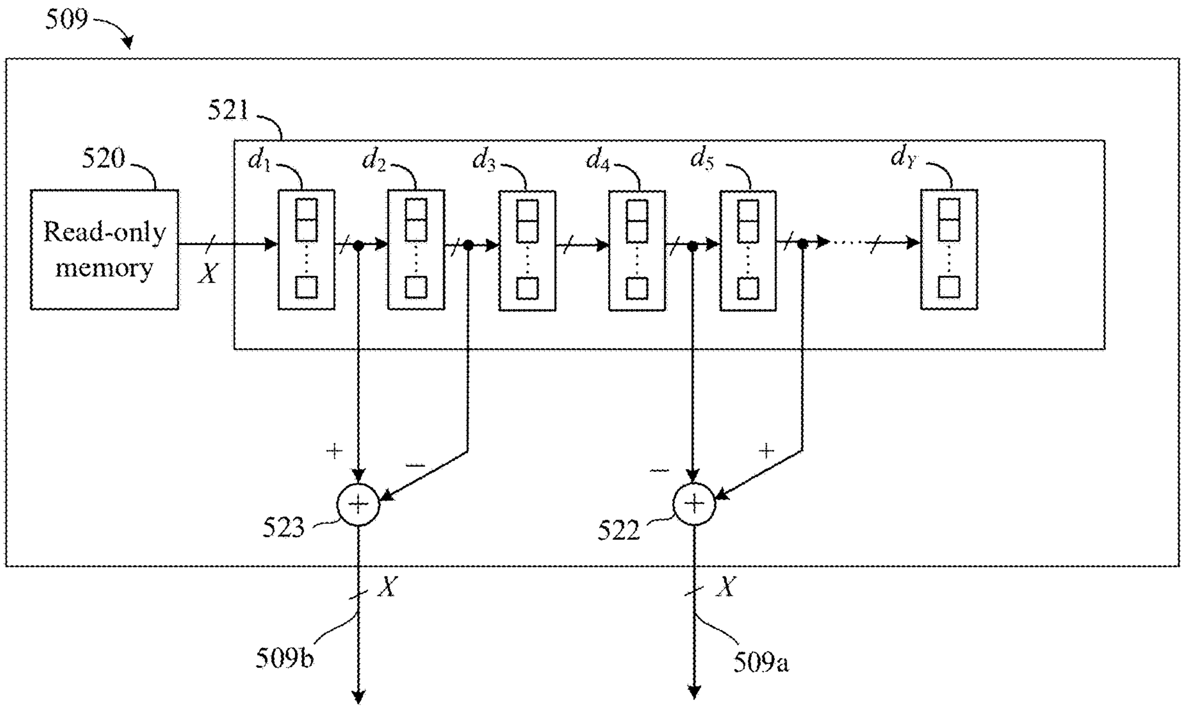
FIG. 6 illustrates a block diagram of a shift parameter unit according to an embodiment of the present invention.

Please refer to FIG. 6, which illustrates a block diagram of the shift parameter unit 509 according to an embodiment of the present invention. The shift parameter unit 509 comprises a read-only memory 520, a plurality of pipeline registers 521 comprising registers $d_1, \ldots, d_Y$. Each register can store X values. The read-only memory 520 stores the values of the base matrix W of size X×Y, and the values of the column of the base matrix W (a X×1 matrix) are output sequentially to the pipeline registers 521 for each clock cycle. This action is equivalent to circularly shifting the columns of the base matrix W. According to the present invention, the shift parameter is the difference between two specific adjacent registers in the pipeline registers 521. As an example, the subtractor 523 calculates the result of subtracting the register $d_1$ from the register $d_2$, yielding the shift parameter 509*b* to the status data shift block 505. Considering that the check node block 504, the variable node block 501, and the V2C shift block 503 all operate in one clock cycle, then after 3 clock cycles, the opposite of the result of subtracting the register $d_4$ from the register $d_5$ should be provided as the shift parameter to the V2C shift block 503. In other words, the subtractor 522 calculates the result of subtracting the register $d_5$ from the register $d_4$ to provide a shift parameter 509*a* to the V2C shift block 503. It is understood that for the case of Y=4, the registers $d_5$ and $d_1$ will have the same value, which implies that the pipeline registers 521 requires at most Y=4 registers, and the shift parameter 509*a* is obtained by subtracting the register $d_1$ from the register $d_4$. The reason why the shift parameter according to the present invention is defined as the difference between two specific adjacent registers in the pipeline registers 521 will be explained later.

Figure 7:
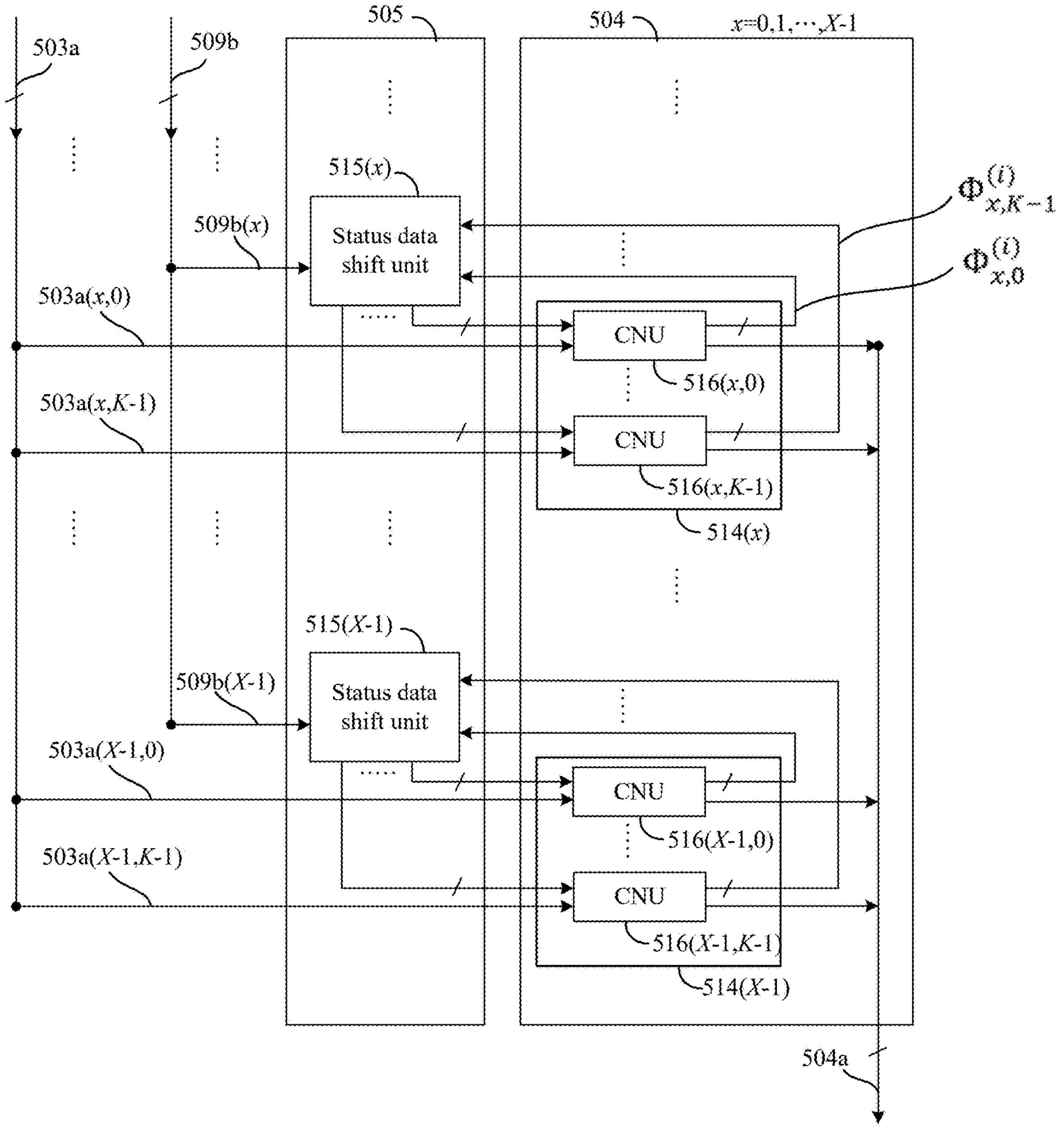
FIG. 7 illustrates a block diagram of a check node block and a status data shift block according to an embodiment of the present invention.

Please refer to FIG. 7, which illustrates a block diagram of the check node block 504 and the status data shift block 505 according to an embodiment of the present invention. The status data shift block 505 comprises X status data shift units 515($x$), x=0, . . . , X−1. The shift parameter 509*b* from the shift parameter unit 509 is a X×1 matrix, which comprises X shift parameters 509*b*($x$), x=0, . . . , X−1, respectively providing shift parameter to each status data shift unit 515($x$). The check node block 504 comprises X check node sub-blocks 514($x$), x=0, . . . , X−1, and each check node sub-block 514($x$) comprises K check node units (CNU) 516($x,k$), k=0, . . . , K−1. Therefore, there is a total of M CNUs 516($x$, $k$), respectively corresponding to the check nodes $c_m$, m=x×K+k. The Q' messages 503*a* output by the V2C shift block 503 is a M×1 matrix, comprising {Q' message 503*a*($x$, $k$)|x=0, . . . , X−1; k=0, . . . , K−1}, respectively inputted to the corresponding CNU 516($x$, $k$).

For each CNU 516($x$, $k$), based on the min-sum decoding algorithm, the Equation (6) for the $i^{th}$ iteration, the processing of the $g^{th}$ group of the variable nodes, can be rewritten as follows:

$$m = x \times K + k // \text{check node unit } 516(x, k) \tag{8}$$

$$n' = N(m) \cap [gK, \ldots, (g+1)K-1] \tag{9}$$

$$[\text{min1}_m, \text{min2}_m, \text{min1\_index}_m] = \underset{n \in N(m)}{\text{min12}}\left(\left|Q_{mn}^{(i)}\right|\right) \tag{10}$$

$$\text{global\_sign}_m = \prod_{n \in N(m)} \text{sign}\left(Q_{mn}^{(i)}\right) \tag{11}$$

$$\text{if } n' == \text{min1\_index}_m \text{ then} \tag{12}$$

$$Mag = \alpha \times \text{min2}_m \tag{13}$$

$$\text{Else} \tag{14}$$

$$Mag = \alpha \times \text{min1}_m \tag{15}$$

$$\text{Sign} = \text{global\_sign}_m \times \text{sign}\left(Q_{mn'}^{(i)}\right) \tag{16}$$

$$R_{mn'}^{(i)} = Mag \times \text{Sign} \tag{17}$$

wherein the α is a fixed compensation parameter for the min-sum decoding algorithm, the function of min12(•) is to extract the minimum value ($\text{min1}_m$), the second minimum value ($\text{min2}_m$), and the index corresponding to the minimum value ($\text{min1\_index}_m$) from the listed input parameters.

$$\text{global\_sign}_m^{(i)}$$

represents a global sign value, and $$Q_{mn'}^{(i)}$$

denotes the Q' message 503*a* received by the CNU 516 (*x*, *k*). Considering the iteration calculation, it can be further rewritten as follows:

$$m = x \times K + k // \text{check node unit } 516(x, k) \tag{18}$$

$$n' = N(m) \cap [gK, \ldots, (g+1)K-1] \tag{19}$$

$$[\text{min1}_m^{(i)}, \text{min2}_m^{(i)}, \text{min1\_index}_m^{(i)}] = \tag{20}$$

$$\text{min12}\left(\text{min1}_m^{(i-1)}, \text{min2}_m^{(i-1)}, \text{min1\_index}_m^{(i-1)}, \left|Q_{mn'}^{(old)}\right|, \left|Q_{mn'}^{(i)}\right|\right)$$

$$\text{global\_sign}_m^{(i)} = \text{global\_sign}_m^{(i-1)} \oplus \text{sign}\left(Q_{mn'}^{(old)}\right) \oplus \text{sign}\left(Q_{mn'}^{(i)}\right) \tag{21}$$

$$\text{if } n' == \text{min1\_index}_m^{(i)} \text{ then} \tag{22}$$

$$Mag = \alpha \times \text{min2}_m^{(i)} \tag{23}$$

$$\text{Else} \tag{24}$$

$$Mag = \alpha \times \text{min1}_m^{(i)} \tag{25}$$

$$\text{Sign} = \text{global\_sign}_m^{(i)} \times \text{sign}\left(Q_{mn'}^{(i)}\right) \tag{26}$$

$$R_{mn'}^{(i)} = Mag \times \text{Sign} \tag{27}$$

wherein $$Q_{mn'}^{(old)}$$

is the value of $$Q_{mn'}^{(i)}$$

before being updated by the check node block 504, the check node block will store the values of $$\text{sign}\left(Q_{mn'}^{(old)}\right) \text{ and } \left|Q_{mn'}^{(old)}\right|$$

for use in the above calculation. In i$^{th}$ iteration, the status data $$S_{x,k}^{(i)}$$

of the CNU 516 (*x*, *k*) is defined as follows:

$$S_{x,k}^{(i)} = \left(\text{min1}_m^{(i)}, \text{min2}_m^{(i)}, \text{min1\_index}_m^{(i)}, \text{global\_sign}_m^{(i)}\right) \tag{28}$$

By summarizing the above equations, in the i$^{th}$ iteration, the CNU 516 (*x*, *k*) calculates the messages $$R_{mn'}^{(i)}$$

based on the received messages $$Q_{mn'}^{(i)}$$

and the status data $$S_{x,k}^{(i-1)}$$

in the previous iteration. According to the present invention, each CNU 516 (*x*, *k*) in the check node sub-block 514 (*x*) sends the status data $$S_{x,k}^{(i)}$$

to the status data shift unit 515 (*x*). The status data shift unit 515 (*x*) circularly shifts the status data $$S_x = \left\{S_{x,k}^{(i)} \mid k = 0, \ldots, K-1\right\}$$

according to the shift parameter 509*b* (*x*) to generate another status data $$S'_{x},$$

which is then fed back to the check node sub-block 514 (*x*) and servers as the status data for each CNU 516 (*x*, *k*) in the next iteration. The output message $$R_{mn'}^{(i)}$$

from each CNU 516(*x*, *k*) is finally aggregated to form the output R messages of the check node block 504 and stored in the R memory 306.

In order to circularly shift the R messages produced by the check nodes to align with the order of the variable nodes, the present invention offers a different approach from the conventional design. This reduces the total number of clock cycles needed in a decoding loop, ultimately improving the overall efficiency. This is a key feature of the present invention. In the conventional design shown in FIG. 2, the check node block 304 also comprises X×K (i.e. M) check node units, respectively corresponding to one check node in the Tanner graph. The element order of the R messages, $$\left\{R_{mn'}^{(i)} \mid m = 0, \ldots, M-1; n' = N(m) \cap (gK, \ldots, (g+1)K-1)\right\},$$

produced by the check node block 304 follows the order of the check nodes. After being circularly shifted by the C2V shift block 305, the R messages will be circularly shifted to align with the order of the variable nodes, i.e.

$$\left\{R_{mn'}^{(i)} \mid n' = gK, \ldots, (g+1)K-1; m = M(n')\right\},$$

and then stored in the R memory 306.

From the perspective of message element order, the element order of the input Q messages $$\{Q_{mn'}^{(i)} \mid n' = gK, \ldots, (g+1)K-1; m \in M(n')\}$$

of the V2C shift block 503 aligns with the order of the variable node index n'. It can be understood that by circularly shifting messages by any shift parameter w, and then circularly shifting them back by the opposite of that shift parameter −w (negative sign indicating reversal), the element order of the messages will be restored to its original one. Therefore, in the present invention, the shift parameters for the V2C shift block 503 and the status data shift block 505 are additive inverses of each other. It should be noted that the timing of the arrival of the shift parameter to the V2C shift block 503 and the status data shift block 505 should have a discrepancy in clock cycles. This is because both the check node block 504 and the status data shift block 505 requires at least one clock cycle of operating time. By circularly shifting the status data of each check node unit 516 through the status data shift block 505 and passing it to the next clock cycle of each check node unit 516, it appears as if the physical check node unit 516 is undergoing circular shifting. Since the shift parameter for the status data shift block 505 is the additive inverse of the V2C shift block 503's shift parameter, the element order of the R messages output by the check node block 504 will match the element order of the input messages of the V2C shift block 503. Therefore, the present invention eliminates the necessity of a C2V shift block, which is required in conventional design.

From an equivalent point of view, the check node units 516 in the present invention can be viewed as being circularly shifted. Consequently, the shift parameter for the V2C shift block 503 needs to be adjusted correspondingly and it will of course differ from the shift parameter for the V2C shift block 303 in the conventional design. It can be observed that since the check node units 516 have equivalently undergone a circular shift, for the subsequent calculation cycle, the shift amount required by the V2C shift block 503 to circularly shift its input messages to align with the order of the check node units 516 is just the shift parameter difference-namely, the difference between the shift parameter of the current and previous cycles. In other words, the shift parameter for the V2C shift block 503 in this invention should be the difference between two adjacent columns in the base matrix. This corresponds to the difference between two adjacent registers in the shift parameter unit 509 shown in FIG. 6. The choice of which two adjacent registers to use will depend on the number of clock cycles required for the operation of each block. Since the shift parameter for the status data shift block 505 should be the opposite of the shift parameter for the V2C shift block 503, it will also be the difference between two adjacent registers in the shift parameter unit 509 shown in FIG. 6. The choice of which two adjacent registers to use will also depend on the number of clock cycles required for the operation of each block.

It should be understood that the functionalities of the variable node block 501, the Q memory 502, the R memory 506, the channel memory 507, the min12(•) function, and the method of generating the decoding outcome based on the channel values and the variable nodes according to Equation (4) in the decoder 112 can be implemented in many ways, all of which are applicable to the present invention. Therefore, the specific implementation details for these portions are not addressed herein. The V2C shift block 503 and the status data shift block 505 can be realized through various ways, such as circular shifter or Barrel shifter, all of which are applicable to the present invention. Therefore, the specific implementation details for these portions are not addressed herein. The individual memory blocks mentioned above are for illustrative purposes and do not necessarily imply that they are physically independent memories. Depending on the implementation strategy, they could be a segment of the overall physical system memory.

The present invention also provides a method for accessing a flash memory, for use in a memory controller. The flash memory controller is coupled to the flash memory to transmit commands and access data. The specific structure and functionalities of the flash memory controller and the flash memory are as described above and will not be further elaborated here.

Figure 8:
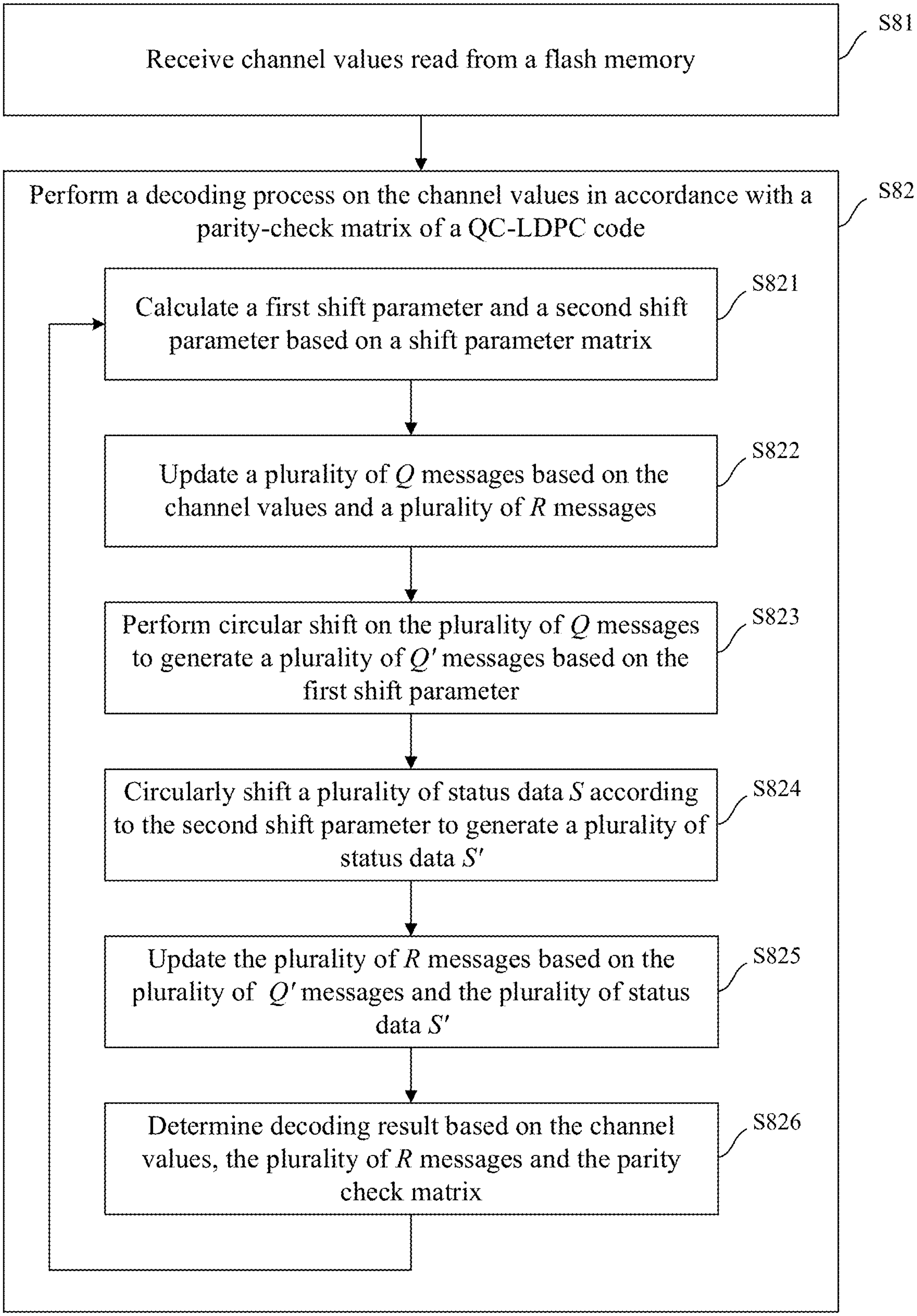
FIG. 8 illustrates a flowchart of a flash memory access method according to an embodiment of the present invention.

Referring to FIG. 8, which illustrates a flowchart of a flash memory access method according to an embodiment of the present invention. The access method of the flash memory comprises the following steps.

Step S81: Receive channel values read from a flash memory.

Step S82: Perform a decoding process on the channel values in an iterative manner in accordance with a parity check matrix of a QC-LDPC code. The decoding process involves a plurality of Q messages and a plurality of R messages, and Step S82 comprises the following steps:

Step S821: Calculate a first shift parameter and a second shift parameter based on a shift parameter matrix, which is initiated according to a base matrix corresponding to the parity check matrix and circularly shifted in each clock cycle. The first shift parameter is the difference between a specific first column and a specific second column of the shift parameter matrix, while the second shift parameter is the difference between a specific third column and a specific fourth column of the shift parameter matrix. The specific first column is adjacent to the second column, and the specific third column is adjacent to the fourth column. The positions of these four specific columns depend on the number of clock cycles required for the operation of each step in the decoding process.

Step S822: Perform a Q message update operation as shown in Equation (2) to update the plurality of Q messages based on the channel values and the plurality of R messages;

Step S823: Perform circular shift on the plurality of Q messages to generate a plurality of Q' messages based on the first shift parameter.

Step S824: Circularly shift a plurality of status data S according to the second shift parameter to generate a plurality of status data S'.

Step S825: Perform an R message update operation following Equations (18) to (27) to update the plurality of R messages based on the plurality of Q' messages and the plurality of status data S', and output the plurality of status data S, which comprises a minimum value, a second minimum value, an index of the minimum value, and a global sign value as shown in Equations (20) and (21).

Step S826: Based on the channel values and the plurality of R messages and the parity check matrix, a decoding outcome is determined once the codeword estimated based on Equation (4) multiplied by the parity check matrix equals to 0.

The above is the process of one decoding loop, wherein the plurality of R messages updated by step S825 are then provided for the calculation in step S822. The calculation loop continues to execute iteratively until the decoding outcome is determined.

It should be understood that the steps in the above invention method are examples for illustrative purposes, and the order of some of these steps is not necessarily sequential. For example, step S825 and step S824 can be carried out simultaneously, and step S821 can also be carried out in parallel with other steps.

The above explanation gives an example of decoding operations with a layered schedule using variable nodes grouped as K. It should be understood that grouping variable nodes as z·K, with z being an integer, for layered schedule decoding operations is also applicable to the present invention.

From the perspective of decoder architecture, compared to the conventional decoder, which comprises four blocks in the decoding loop: the variable node block, the V2C shift block, the check node block, and the C2V shift block, it can be seen that the decoder according to the present invention only comprises three blocks in the decoding loop: the variable node block, the V2C shift block, and the check node block. This reduction in the number of blocks helps to improve the convergence speed of the decoding process, thereby enhancing flash memory access efficiency.

The aforementioned details represent only specific implementations of the present disclosure. However, the protection scope of the present disclosure is not limited thereto. Any modifications or replacements that can be easily devised by those skilled in the art within the technical scope of the present disclosure should all fall within the protection scope of the present disclosure. Consequently, the protection scope of the present disclosure should be defined by the protection scope of the appended claims.

What is claimed is:

1. A flash memory controller for accessing a flash memory, comprising:

a first memory for storing a program code;

a microprocessor for executing the program code to control access to the flash memory; and a decoder for receiving channel values read from the flash memory and performing a decoding process of a quasi-cyclic low-density parity-check (QC-LDPC) code, wherein the decoding process of the decoder involves a plurality of Q messages and a plurality of R messages, and the decoder comprises:

a shift parameter unit for generating a first shift parameter and a second shift parameter based on a X×Y base matrix of the QC-LDPC code;

a second memory for storing the plurality of Q messages;

a third memory for storing the plurality of R messages;

a variable node block for updating the plurality of Q messages based on the channel values read from the flash memory and the plurality of R messages;

a first shift block for generating a plurality of Q' messages based on the plurality of Q messages and the first shift parameter;

a second shift block for generating a plurality of status data S'; and a check node block for updating the plurality of R messages and outputting a plurality of status data S based on the plurality of Q' messages and the plurality of status data S', wherein each status data S comprises a minimum value, a second minimum value, an index of the minimum value, and a global sign value;

wherein the second shift block receives the plurality of status data S and performs circular shift according to the second shift parameter to generate the plurality of status data S'.

2. The flash memory controller according to claim 1, wherein the check node block comprises a sub-block, the second shift block comprises a shift unit, the second shift parameter comprises a sub-parameter, the plurality of status data S comprise a first status data S through a $K^{th}$ status data S with K being an integer, the plurality of status data S' comprises a first status data S' through a $K^{th}$ status data S', and the plurality of Q' messages comprise a first Q' message through a $K^{th}$ Q' message, the plurality of R messages comprise a first R message through a $K^{th}$ R message, and the shift unit of the second shift block receives the first status data S through the $K^{th}$ status data S, and performs circular shift according to the sub-parameter of the second shift parameter, and generates the first status data S' through the $K^{th}$ status data S'; and the sub-block of the check node block comprises a first check node unit through a $K^{th}$ check node unit, wherein the $k^{th}$ check node unit receives the $k^{th}$ Q' message and the $k^{th}$ status data S', updates the $k^{th}$ R message and outputs the $k^{th}$ status data S with k being an integer from 1 to K.

3. The flash memory controller according to claim 2, wherein the check node block comprises X sub-blocks, each sub-block of the check node block comprises K check node units, the second shift block comprises X shift units, the second shift parameter comprises X sub-parameters, the plurality of status data S comprises X·K status data S, the plurality of status data S' comprises X·K status data S', the plurality of Q' messages comprises (X·K) Q' messages, and the plurality of R messages comprises (X·K) R messages.

4. The flash memory controller according to claim 1, the shift parameter unit comprises:

a fourth memory for storing the X·Y base matrix; and a pipeline register comprising a plurality of registers with each register being able of storing X values;

wherein each column of the base matrix is output sequentially to the pipeline register for each clock cycle, the first shift parameter output by the shift parameter unit is a difference between a first register and a second register in the pipeline register, and the second shift parameter output by the shift parameter unit is a difference between a third register and a fourth register in the pipeline register, wherein the first register is adjacent to the second register and the third register is adjacent to the fourth register.

5. The flash memory controller according to claim 4, wherein the number of registers in the pipeline register is less than or equal to Y.

6. The flash memory controller according to claim 1, wherein the first shift block and the second shift block are both Barrel shifters.

7. A method for improving access efficiency of a flash memory, for use in a flash memory controller coupled to the flash memory, the method comprising:

receiving, by a decoder, channel values read from the flash memory; and performing, by the decoder, a decoding process on the channel values in an iterative manner according to a parity check matrix of a quasi-cyclic low-density parity-check (QC-LDPC) code, wherein the decoding process involves a plurality of Q messages and a plurality of R messages, and the decoding process comprises the following steps:

calculating, using a shift parameter unit comprising a memory storing a base matrix and a pipeline register for storing a shift parameter matrix, a first shift parameter and a second shift parameter based on the shift parameter matrix, wherein the first shift parameter is a difference between a specific first column and a specific second column of the shift parameter matrix, the specific first column being adjacent to the specific second column, and the second shift parameter is a difference between a specific third column and a specific fourth column of the shift parameter matrix, the specific third column being adjacent to the specific fourth column;

updating, using a variable node block, the plurality of Q messages based on the channel values and the plurality of R messages;

performing circular shift, using a first shift block, on the plurality of Q messages to generate a plurality of Q' messages according to the first shift parameter;

circularly shifting, using a second shift block, a plurality of status data S according to the second shift parameter to generate a plurality of status data S', wherein each of the plurality of status data S comprises a minimum value, a second minimum value, an index of the minimum value, and a global sign value; and updating, using a check node block, the plurality of R messages based on the plurality of Q' messages and the plurality of status data S' and outputting the plurality of status data S;

wherein the shift parameter unit outputs each column of the base matrix sequentially to the pipeline register for each clock cycle.

8. A method for improving access efficiency of a flash memory, for use in a flash memory controller coupled to the flash memory, the method comprising:

receiving, by a decoder, channel values read from the flash memory; and performing, by the decoder, a decoding process of a quasi-cyclic low-density parity-check (QC-LDPC) code, wherein the decoding process involves a plurality of Q messages and a plurality of R messages, and the decoding process comprises the following steps:

generating, using a shift parameter unit, a first shift parameter and a second shift parameter based on a X×Y base matrix of the QC-LDPC code;

updating, using a variable node block, the plurality of Q messages based on the channel values read from the flash memory and the plurality of R messages;

generating, using a first shift block, a plurality of Q' messages based on the plurality of Q messages and the first shift parameter;

generating, using a second shift block, a plurality of status data S' by performing circular shift on a plurality of status data S according to the second shift parameter; and updating, using a check node block, the plurality of R messages and outputting the plurality of status data S based on the plurality of Q' messages and the plurality of status data S', wherein each status data S comprises a minimum value, a second minimum value, an index of the minimum value, and a global sign value.

9. The method according to claim 8, wherein the check node block comprises a sub-block, the second shift block comprises a shift unit, the second shift parameter comprises a sub-parameter, the plurality of status data S comprise a first status data S through a $K^{th}$ status data S with K being an integer, the plurality of status data S' comprises a first status data S' through a $K^{th}$ status data S', and the plurality of Q' messages comprise a first Q' message through a $K^{th}$ Q' message, the plurality of R messages comprise a first R message through a $K^{th}$ R message, and the shift unit of the second shift block receives the first status data S through the $K^{th}$ status data S, and performs circular shift according to the sub-parameter of the second shift parameter, and generates the first status data S' through the $K^{th}$ status data S'; and the sub-block of the check node block comprises a first check node unit through a $K^{th}$ check node unit, wherein the $k^{th}$ check node unit receives the $k^{th}$ Q' message and the $k^{th}$ status data S', updates the $k^{th}$ R message and outputs the $k^{th}$ status data S with k being an integer from 1 to K.

10. The method according to claim 9, wherein the check node block comprises X sub-blocks, each sub-block of the check node block comprises K check node units, the second shift block comprises X shift units, the second shift parameter comprises X sub-parameters, the plurality of status data S comprises X·K status data S, the plurality of status data S' comprises X·K status data S', the plurality of Q' messages comprises (X·K) Q' messages, and the plurality of R messages comprises (X·K) R messages.

11. The method according to claim 8, wherein the shift parameter unit comprises:

a fourth memory for storing the X·Y base matrix; and a pipeline register comprising a plurality of registers with each register being capable of storing X values;

wherein each column of the base matrix is output sequentially to the pipeline register for each clock cycle, the first shift parameter output by the shift parameter unit is a difference between a first register and a second register in the pipeline register, and the second shift parameter output by the shift parameter unit is a difference between a third register and a fourth register in the pipeline register, wherein the first register is adjacent to the second register and the third register is adjacent to the fourth register.

12. The method according to claim 11, wherein the number of registers in the pipeline register is less than or equal to Y.

13. The method according to claim 8, wherein the first shift block and the second shift block are both Barrel shifters.

* * * * *